US008462167B2

(12) United States Patent
Kawahara et al.

(10) Patent No.: US 8,462,167 B2
(45) Date of Patent: Jun. 11, 2013

(54) MEMORY ACCESS CONTROL CIRCUIT AND IMAGE PROCESSING SYSTEM

(75) Inventors: Akihiro Kawahara, Yokohama (JP); Makoto Adachi, Yokohama (JP); Kouji Nishikawa, Yokohama (JP); Masayuki Nakamura, Yokohama (JP); Motonobu Mamiya, Yokohama (JP); Kae Yamashita, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 895 days.

(21) Appl. No.: 12/608,322

(22) Filed: Oct. 29, 2009

(65) Prior Publication Data

US 2010/0123728 A1 May 20, 2010

(30) Foreign Application Priority Data

Nov. 14, 2008 (JP) ................................ 2008-292736

(51) Int. Cl.
*G06T 1/60* (2006.01)

(52) U.S. Cl.
USPC ........... 345/530; 345/531; 345/532; 345/536; 345/558; 345/559; 711/162

(58) Field of Classification Search
USPC ........... 345/530–532, 536, 558–559; 711/162
See application file for complete search history.

(56) References Cited

FOREIGN PATENT DOCUMENTS

| | | |
|---|---|---|
| JP | 6-131248 | 5/1994 |
| JP | 8-329233 | 12/1996 |
| JP | 2002-123827 | 4/2002 |

*Primary Examiner* — Said Broome
*Assistant Examiner* — Peter Hoang
(74) *Attorney, Agent, or Firm* — Staas & Halsey LLP

(57) ABSTRACT

A memory access control circuit includes a first internal register, an address transmitting unit that sets a state of the first internal register to a first state to transmit a first address and sets a state of the first internal register to a second state to transmit a second address, a second internal register, a data receiving unit that sets a state of the second internal register to a third state to receive first data corresponding to the first address, performs data processing on the first data without delay, sets a state of the second internal register to a fourth state to receive second data corresponding to the second address, and performs data processing on the second data after delaying the second data by a given delay time, a first backup unit and a second backup unit.

20 Claims, 12 Drawing Sheets

MEMORY ACCESS CONTROL CIRCUIT AND IMAGE PROCESSING SYSTEM

CROSS-REFERENCE TO RELATED APPLICATIONS

This application claims the benefit of priority from Japanese Patent Application No. 2008-292736 filed on Nov. 14, 2008, the entire contents of which are incorporated herein by reference.

BACKGROUND

1. Field

The embodiments discussed herein relate to a circuit that controls memory access and an image processing system.

2. Description of Related Art

In blending processing performed by a graphic drawing apparatus, a given operation is performed between a current output image DST and a new input image SRC, and operation result is stored as an output image DST in a memory. Examples of a type of the blending processing operation include substitution (DST=SRC), multiplication (DST=DST×SRC), and alpha blending (DST=(1−α)DST+αSRC). For example, in the substitution, the input image constitutes the output image of the next frame. For example, in the alpha blending, a translucent image in which the current output image and the new input image are overlapped with each other constitutes the output image of the next frame.

The related art is disclosed in Japanese Laid-open Patent Publication Nos. H8-329233, 2002-123827, H6-131248 or the like.

SUMMARY

According to one aspect of embodiments, a memory access control circuit is provided which includes a first internal register, an address transmitting unit that sets a state of the first internal register to a first state to transmit a first address and sets a state of the first internal register to a second state to transmit a second address, a second internal register, a data receiving unit that sets a state of the second internal register to a third state to receive first data corresponding to the first address, performs data processing on the first data without delay, sets a state of the second internal register to a fourth state to receive second data corresponding to the second address, and performs the data processing on the second data after delaying the second data by a given delay time, a first backup unit and a second backup unit. In response to completion of transmission of the first address from the address transmitting unit, the state of the first internal register is stored in the first backup unit and the second state is set to the first internal register by the first backup unit. In response to completion of the data processing of the first data by the data receiving unit, the state of the second internal register is stored in the second backup unit by utilizing the given delay time and the fourth state is set to the second internal register by the second backup unit.

Additional advantages and novel features of the various embodiments will be set forth in part in the description that follows, and in part will become more apparent to those skilled in the art upon examination of the following or upon learning by practice of the various embodiments.

DESCRIPTION OF EMBODIMENTS

During the blending processing, in a memory interface unit of a graphic drawing apparatus, a constant amount of image data stored in an external memory is read, and the read constant amount of image data is stored in RAM. When an input image SRC, an output image DST, and an alpha map ALP (image data in which an α value is specified in each pixel) are stored as image data in RAM, the image data is transferred to a blending processing unit to perform the blending processing. The memory interface unit stores the constant amount of output image data generated by the blending processing in the external memory as part of a new output image DST. The read processing, the blending processing, and the write processing are repeatedly performed to the constant amount of image data corresponding to a RAM capacity, thereby completing the blending processing for the whole image.

The read of the input image SRC, output image DST, and alpha map ALP and the write of the new output image DST are controlled by a control unit, for example, a state machine provided in the memory interface unit. The input image SRC is read from the external memory when the control unit is in an SRC state, the output image DST is read from the external memory when the control unit is in a DST state, and the alpha map ALP is read from the external memory when the control unit is in an ALP state. When the control unit becomes a W_DST state, the output image corresponding to the blending processing result is written in the external memory. An address transmitting unit and a data receiving unit of a memory interface unit are activated to read and write the image data according to the state of the control unit.

Figure 1:
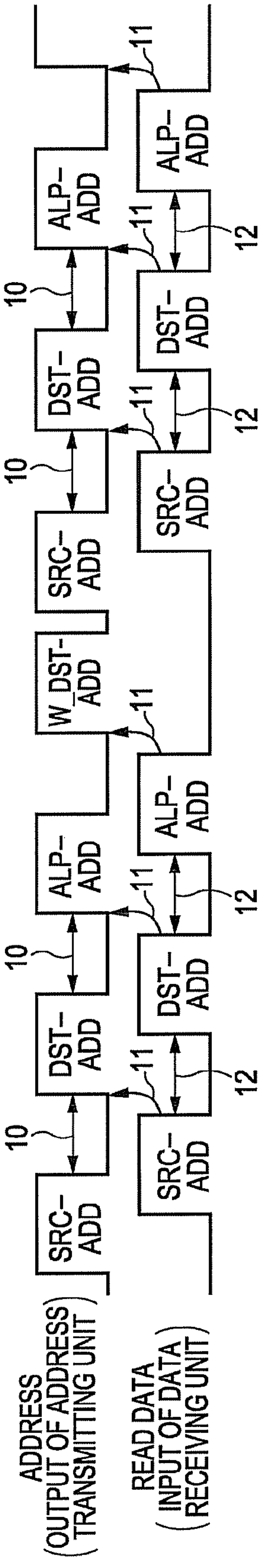
FIG. 1 illustrates an exemplary timing chart of an output address and receiving data.

FIG. 1 illustrates an exemplary timing chart of an output address and receiving data. For example, the address is supplied from the address transmitting unit, and the data is received by the data receiving unit. In response to a read address SRC-ADD transmitted from the address transmitting unit, input image data SRC-DATA is read from the memory. Output image data DST-DATA and alpha map data ALP-DATA are read in response to read addresses DST-ADD and ALP-ADD, respectively. A next output image DST (not illustrated) is written in a write address W_DST-ADD transmitted by the address transmitting unit.

There is a time interval 10 between an address transmitted to an image by the address transmitting unit and an address transmitted to a next image by the address transmitting unit. For example, there is the time interval 10 between the address SRC-ADD transmitted to read the input image SRC and the address DST-ADD transmitted to read the output image DST.

This is because a state transition of the control unit is performed when the write of the read data into RAM is completed. For example, when the address transmitting unit transmits the address SRC-ADD, the data receiving unit receives the input image SRC after a given delay time for a memory read operation. The data receiving unit sequentially stores the receiving image data in RAM, and the write of the receiving data into RAM is completed after receiving the input image SRC. In response to the completion of writing the receiving data into RAM, the control unit transits from the SRC state to the DST state, and the address transmitting unit starts the transmission of the address DST-ADD. The state transition timing is indicated by an arrow 11 in FIG. 1.

The address transmitting unit backups a register value of an internal register during the time interval 10 of FIG. 1. The backuped register value is written in the internal register when the next operation in substantially the same state is resumed. For example, the backuped register value in the SRC state operation is written in the internal register when the next SRC state operation is resumed. The data receiving unit backups the register value of the internal register during the time interval 12 between the pieces of read data of FIG. 1. The time intervals 10 and 12 may be lengthened according to the state transition indicated by the arrow 11 after the completion of the operation of the data receiving unit.

Figure 2:
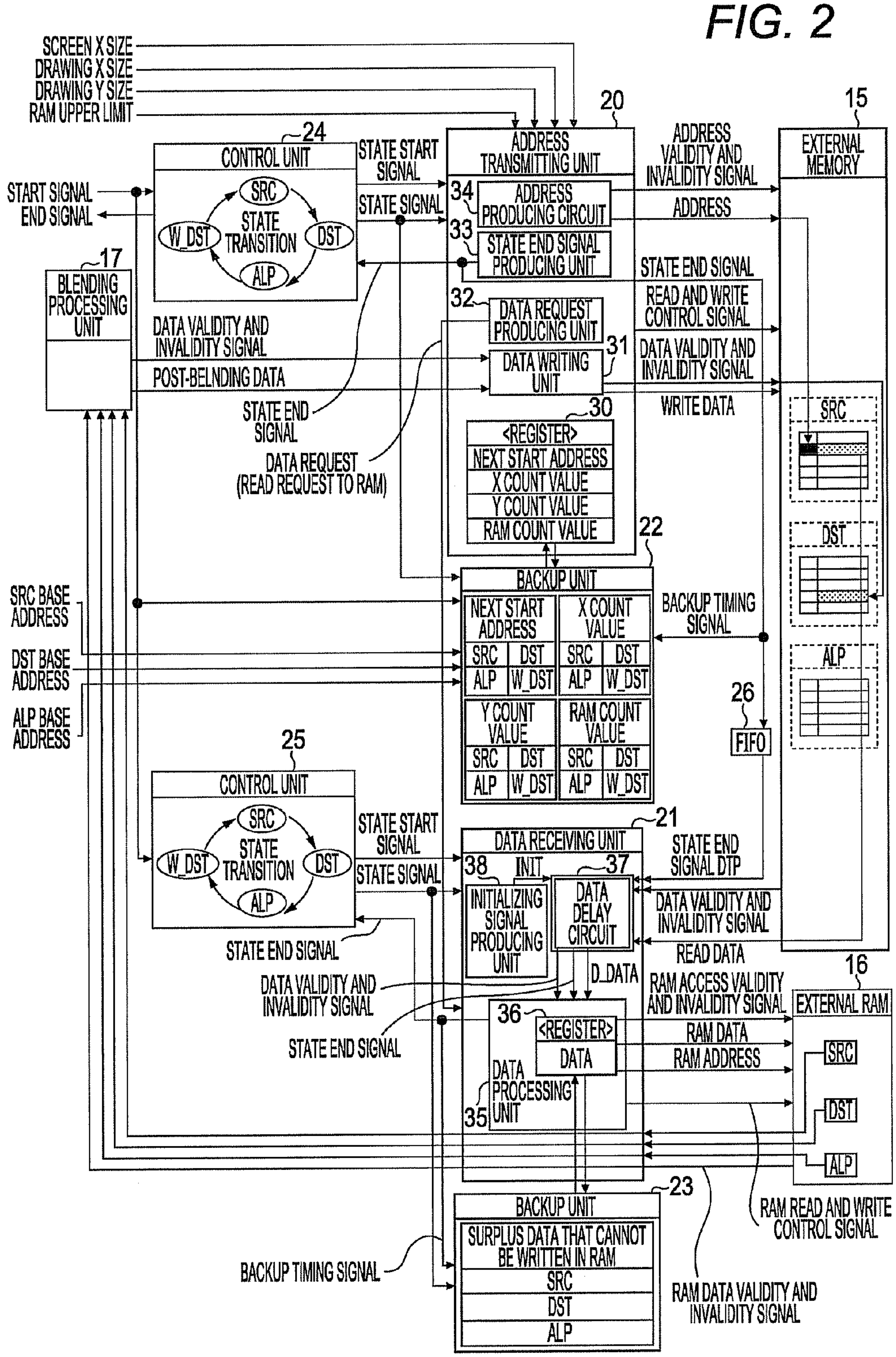
FIG. 2 illustrates an embodiment.

FIG. 2 illustrates a memory access control circuit according to an embodiment of the invention. Referring to FIG. 2, the memory access control circuit includes an address transmitting unit 20, a data receiving unit 21, a backup unit 22, a backup unit 23, a control unit 24, a control unit 25, and FIFO 26. The memory access control circuit reads the image data stored in the external memory 15 by a constant amount, and the memory access control circuit stores the read constant amount of image data in the external RAM 16. When the constant amount of input image SRC, the constant amount of output image DST, and the constant amount of alpha map ALP are stored in RAM, these pieces of image data are supplied to the blending processing unit 17 to perform the blending processing. The constant amount of output image data generated by the blending processing is stored in the external memory 15 as part of the new output image DST by the memory access control circuit. The read processing, the blending processing, and the write processing are repeatedly performed to the constant amount of image data corresponding to the capacity of the external RAM 16 to complete the blending processing for the whole image. The units of FIG. 2 are operated in synchronization with a common clock signal.

The control units 24 and 25, for example, the state machine provided in the memory access control circuit control the read operation of the input image SRC, output image DST, and alpha map ALP and the write operation of the new output image DST. The control unit 24 controls the state transition of the address transmitting unit 20, and the control unit 25 controls the state transition of the data receiving unit 21.

The address transmitting unit 20 includes a register 30, a data writing unit 31, a data request producing unit 32, a state end signal producing unit 33, and an address producing circuit 34. The address producing circuit 34 outputs the address to the external memory 15 in order to read the input image SRC when the state signal supplied from the control unit 24 indicates the SRC state. The address producing circuit 34 outputs the address to the external memory 15 in order to read the output image DST to the external memory 15 when the state signal supplied from the control unit 24 indicates the DST state. The address producing circuit 34 outputs the address to the external memory 15 in order to read the alpha map ALP when the state signal supplied from the control unit 24 indicates the ALP state. The address producing circuit 34 outputs the address to the external memory 15 in order to write the data blending-processed by the blending processing unit 17 when the state signal supplied from the control unit 24 indicates the W_DST state. The address producing circuit 34 validates an address validity and invalidity signal while outputting a valid address. The address producing circuit 34 invalidates the address validity and invalidity signal while the address has an invalid value. The data writing unit 31 that outputs the blending-processed data validates the data validity and invalidity signal while outputting valid data. The data writing unit 31 invalidates the data validity and invalidity signal while the data has an invalid value.

A start address, an X counter value, a Y counter value, and a RAM counter value are stored in the register 30. For example, an SRC register value is stored in the register 30, and a series of SRC read addresses are transmitted from the address transmitting unit 20 to the external memory 15. For example, a DST register value is stored in the register 30, and a series of DST read addresses are transmitted from the address transmitting unit 20 to the external memory 15. In response to the completion of transmitting the series of SRC read addresses, the SRC register value stored in the register 30 is saved in the backup unit 22 as the SRC register value. The DST register value is stored in the register 30 from the backup unit 22. The SRC register value saved in the backup unit 22 is stored in the register 30 from the backup unit 22 when the SRC read address is delivered in the next SRC state. The operation of the SRC state, DST state, ALP state, or W_DST state is resumed from the state in which the previous operation has completed by saving the register value in the backup unit 22 and returning the register value from the backup unit 22.

The register value is saved in the backup unit 22 based on a state end signal generated by the state end signal producing unit 33. The state end signal producing unit 33 supplies the state end signal indicating the state end caused by the completion of the address transmission when the address producing circuit 34 transmits the final address of the series of read addresses to be transmitted. The state end signal is supplied to the backup unit 22, FIFO 26, and the control unit 24. The control unit 24 causes the internal state to transit in response to the state end signal, and the state indicated by the output state signal is changed based on the transition. The control unit 24 asserts the state start signal every transition of the internal state. For example, the internal state of the control unit 24 transits in the order of SRC→DST→ALP→W_DST.

The data receiving unit 21 includes a data processing unit 35, a register 36, a data delay circuit 37, and an initializing signal producing unit 38. The data receiving unit 21 receives the input image SRC read from the external memory 15 when the state signal supplied from the control unit 25 indicates the SRC state. The data receiving unit 21 receives the output image DST read from the external memory 15 when the state signal supplied from the control unit 25 indicates the DST state. The data receiving unit 21 receives the alpha map ALP read from the external memory 15 when the state signal supplied from the control unit 25 indicates the ALP state. These pieces of received image data are stored in the external RAM 16 through the data delay circuit 37 and the data processing unit 35. The data receiving unit 21 reads the pieces of image data SRC, DST, and ALP from the external RAM 16 to supply the pieces of image data SRC, DST, and ALP to the blending processing unit 17 when the state signal supplied from the control unit 25 indicates the W_DST state.

When the data receiving unit 21 receives the image data from the external memory 15, the data receiving unit 21 refers to data validity and invalidity signal supplied from the external memory 15. The data validity and invalidity signal is validated when the output data of the external memory 15 is valid, and the data validity and invalidity signal is invalidated when the output data of the external memory 15 is invalid. The data processing unit 35 of the data receiving unit 21 writes the valid data in the external RAM 16.

The register 36 stores data that is not written in the external RAM 16. For example, the SRC data that is not written in the external RAM 16 in the SRC state is written in the register 36 when the SRC state is ended. The register value of the register 36 is saved in the backup unit 23 as the SRC data when the SRC state is ended. The DST register value (DST data that is not written in the previous DST state) is written in the register 36 from the backup unit 23 in order to prepare the DST state subsequent to the SRC state.

The control unit 24 that controls the transition of the register value of the register 30 in the address transmitting unit 20 and the control unit 25 that controls the transition of the register value of the register 36 in the data receiving unit 21 are separately provided in the memory access control circuit of FIG. 2. Therefore, when the address transmission is ended in a certain state, for example, the SRC state, the address transmitting unit 20 starts the address transmission in the next state, for example, the DST state. Accordingly, a time between the address transmissions is shortened, thereby efficiently reading the data. For example, the address transmission in the next state may be started after a time for saving the register value.

In the data receiving unit 21, it may take time to save the register value of the register 36 in the backup unit 23. Because the external memory 15 is coupled to the common bus, for example, the data read from the external memory 15 may be delayed when another circuit having a higher priority than the memory access circuit of FIG. 2 interruption-accesses the external memory 15. For example, the data read from the external memory 15 may be delayed when the read address of the external memory 15, which is output from the address transmitting unit 20, moves to a different page or block. For example, a time interval between the address transmission in the SRC state and the address transmission in the DST state subsequent to the SRC state may be shortened due to the delay of reading the data. For example, an interval between the image data of the read input image SRC and the image data of the output image DST may be shortened. Therefore, a time to save the register value of the register 36 in the backup unit 23 may be shortened.

In the memory access control circuit of FIG. 2, the data delay circuit 37 supplies a desired time interval between the pieces of read data. The data delay circuit 37 supplies the read data of the input image SRC to the data processing unit 35 without delay, and the data processing unit 35 writes the read data of the input image SRC in RAM. The data delay circuit 37 supplies the image data of the output image DST to the data processing unit 35 after a given delay time, and the data processing unit 35 writes the image data of the output image DST in RAM. During the given delay time, the register value of the register 36 is saved in the backup unit 23, and the next register value is stored in the register 36 from the backup unit 23.

The data delay circuit 37 utilizes the state end signal that is supplied from the address transmitting unit 20 and delayed by FIFO 26. The address transmitting unit 20 stores a NULL value, for example, "0" in FIFO 26 every time one read address is transmitted. The address transmitting unit 20 stores a non-NULL value, for example, the state end signal of "1" in FIFO 26 when the final read address is transmitted. The number of stages of FIFO 26 may be a maximum value of the number of addresses that may be transmitted by the address transmitting unit 20 until the data receiving unit 21 receives the read data corresponding to the read address transmitted by the address transmitting unit 20. FIFO 26 does not overflow at the set maximum value. Even if FIFO 26 includes the number of stages equal to or lower than the maximum value, the address transmission may be suppressed when the FIFO 26 becomes the FULL state.

The data receiving unit 21 reads one piece of data stored in FIFO 26 every time one piece of valid read data is read from the external memory 15. The data receiving unit 21 reads the state end signal from FIFO 26 when the final read data is captured in the current state. In response to the state end signal read from FIFO 26, the data delay circuit 37 of the data receiving unit 21 delays the data read from the external memory 15 by the given delay time.

Figure 3:
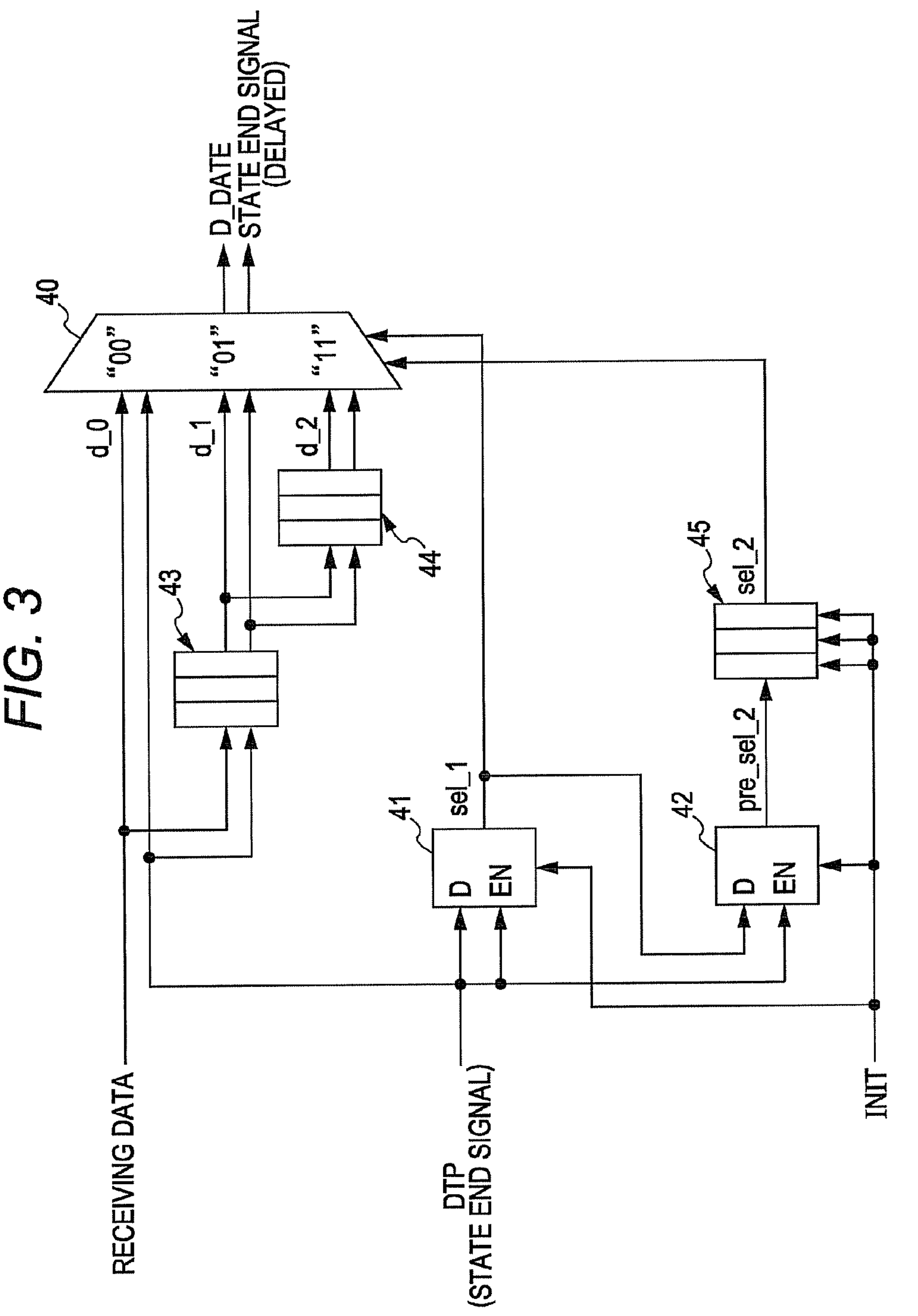
FIG. 3 illustrates an exemplary data delay circuit.

FIG. 3 illustrates an exemplary data delay circuit. The data delay circuit of FIG. 3 may be the data delay circuit 37 of FIG. 2. The data delay circuit 37 includes a selector 40, flip flops 41 and 42, and shift registers 43 to 45. The shift registers 43 to 45 are operated in synchronization with the common clock signal. The data delay circuit 37 includes a first data path through which the received data is supplied to the selector 40 without delay. The data delay circuit 37 includes a second data path through which the received data is supplied to the selector 40 while the shift register 43 delays the received data by a first given delay time. The data delay circuit 37 includes a third data path through which the received data is supplied to the selector 40 while the shift registers 43 and 44 delay the received data by a second given delay time. The data delay circuit 37 includes a data path that is provided in parallel with each of the path of the received data, and the state end signal DTP is similarly delayed and selected to the data path.

The selector 40 is controlled by selection control signals sel_1 and sel_2. The selector 40 selects data d_0 of the first data path when the selection control signal sel_1 has "0" while the selection control signal sel_2 has "0". The selector 40 selects data d_1 of the second data path when the selection control signal sel_1 has "1" while the selection control signal sel_2 has "0". The selector 40 selects data d_2 of the third data path when the selection control signal sel_1 has "1" while the selection control signal sel_2 has "1". The flip flop 41 generates the selection control signal sel_1, and the flip flop 42 and the shift register 45 generate the selection control signal sel_2. The flip flops 41 and 42 and the shift register 45 are initialized based on assertion of an initializing signal INIT.

Figure 4:
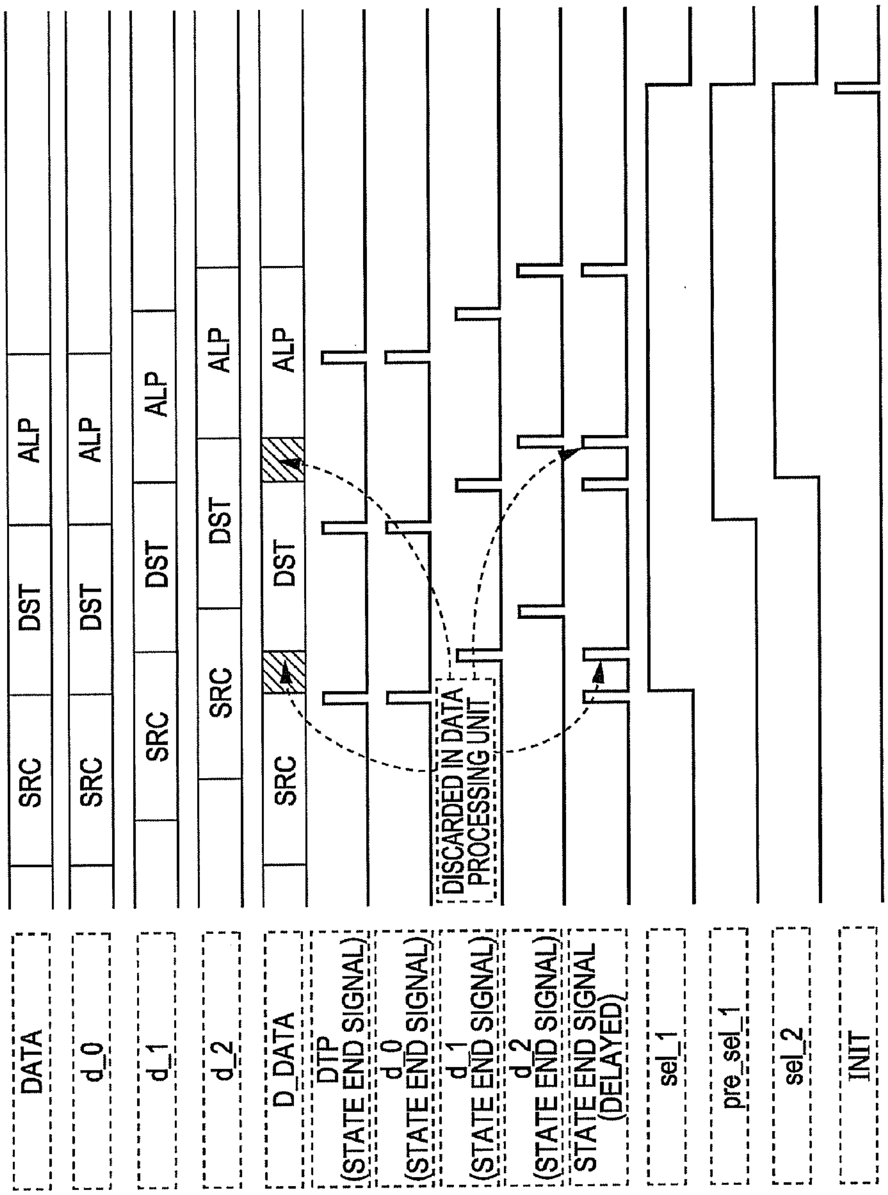
FIG. 4 illustrates an exemplary operation timing of a data delay circuit.

FIG. 4 illustrates an exemplary operation timing of the data delay circuit. The operation timing of FIG. 4 may be the operation timing of the data delay circuit 37 of FIG. 3. The pieces of data SRC, DST, and ALP are continuously supplied with no interval. In such cases, a time for saving contents of the register 36 in the backup unit 23 may be short in the transition between the states including the SRC state, DST state, and ALP state. Therefore, for example, the data delay circuit 37 of FIG. 3 generates data D_DATA in which an interval is inserted. The selector 40 selects the data d_0 having no delay until the state end signal DTP comes. After the state end signal DTP comes, the selector 40 selects the data d_1 delayed by the first given time. The flip flop 41 is set based on the state end signal DTP, the selection control signal sel_1 is set to "1", and the delayed data d_1 is selected. The selector 40 selects the data d_2 delayed by the second given time after the first given time elapses since the next state end signal DTP comes. The flip flop 42 is set based on the next state end signal DTP, pre_sel_2 is set to "1", and the selection control signal sel_2 becomes "1" after the delay time of the shift register 45 having the substantially same delay amount as the shift register 43. The delayed data d_2 is selected based on the selection control signal sel_2 having "1". In the output data D_DATA of the selector 40, the interval is inserted among the pieces of data SRC, DST, and ALP as illustrated in FIG. 4.

The data delay circuit 37 supplies the data D_DATA to the data processing unit 35 of FIG. 2, and data processing such as write operation is performed to the data D_DATA. The data delay circuit 37 may delay the read data and the data validity and invalidity signal. The delayed data validity and invalidity signal is supplied to the data processing unit 35, whereby the data processing unit 35 performs the data processing such as the write operation to the valid data.

Figure 5:
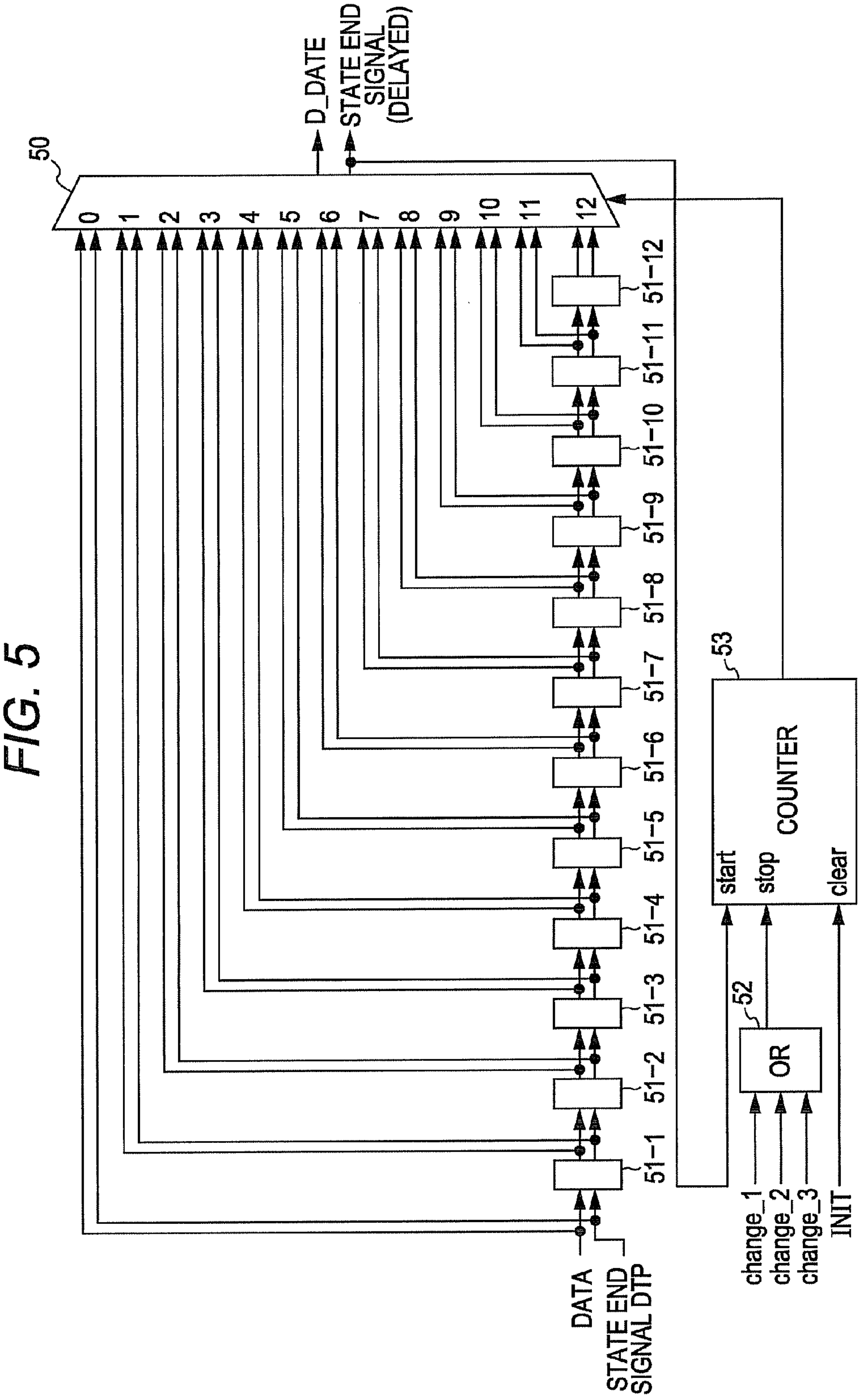
FIG. 5 illustrates another exemplary data delay circuit.

FIG. 5 illustrates another exemplary data delay circuit. The data delay circuit of FIG. 5 may be the data delay circuit 37 of FIG. 2. The data delay circuit 37 includes a selector 50, flip flops 51-1 to 51-12, an OR circuit 52, and a counter 53. The flip flops 51-1 to 51-12 are coupled in series, and the flip flops 51-1 to 51-12 are operated in synchronization with the common clock signal. The flip flops 51-1 to 51-12 function as shift registers that sequentially delay the data and the state end signal DTP. Although the data delay circuit of FIG. 5 includes 12 flip flops, the number of flip flops may be set to any number. The selector 50 receives the pieces of output data from the flip flops 51-1 to 51-12. The counter 53 starts counting in response to the state end signal supplied from the selector 50. The selector 50 selects one of the pieces of output data of the flip flops 51-1 to 51-12 according to the counter value of the counter 53.

Figure 6:
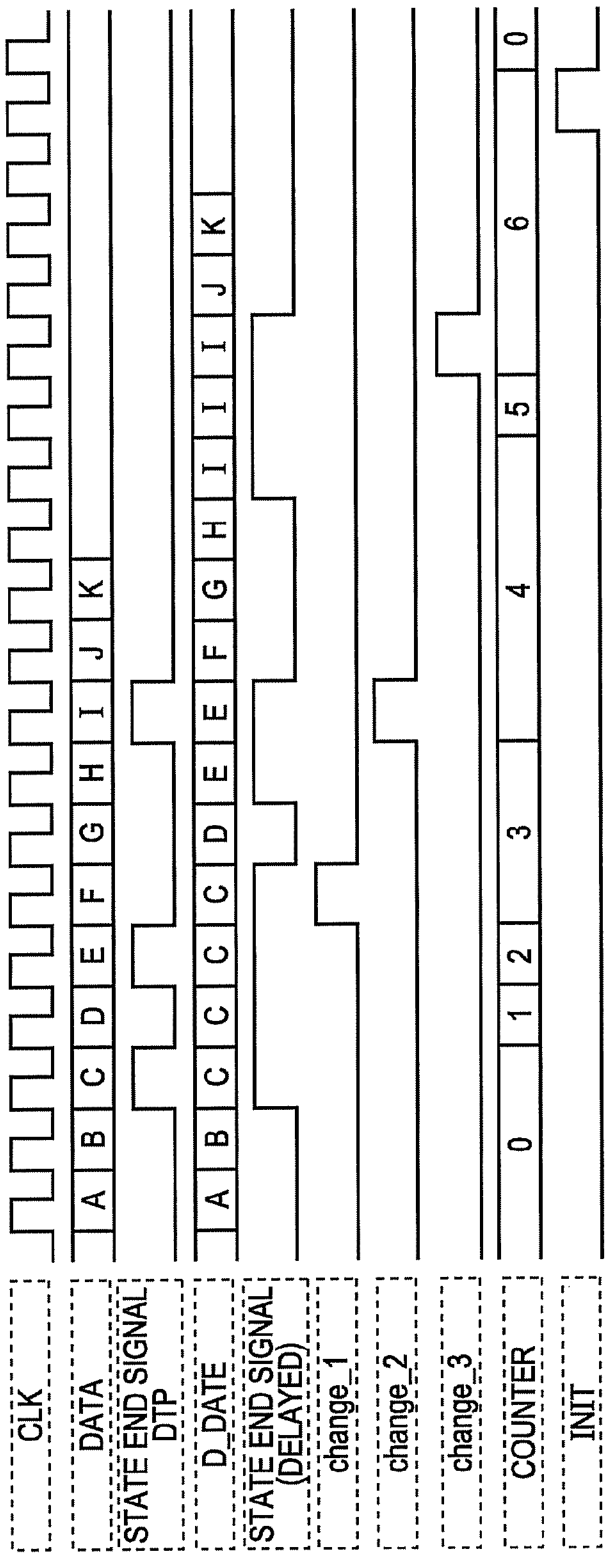
FIG. 6 illustrates another exemplary operation timing of a data delay circuit.

FIG. 6 illustrates another exemplary operation timing of a data delay circuit. The operation timing of FIG. 6 may be the operation timing of the data delay circuit 37 of FIG. 2. Pieces of data A, B, C, D, . . . are supplied in synchronization with each cycle of a clock signal CLK. In the initial state, the counter value of the counter 53 is set to zero, and the selector 50 selects the received data and state end signal DTP without delay. Therefore, the pieces of data A to C become the output data D_DATA of the selector 50 without delay. The state end signal DTP is also supplied from the selector 50 without delay. The state end signal DTP is expressed by "state end signal (delayed)" in FIG. 6. The counter 53 starts the counting in response to the state end signal (delayed) supplied from the selector 50. During the counting of the counter 53, the selector 50 sequentially selects flip flop outputs delayed every cycle. Therefore, the selector 50 continuously supplies substantially the same data C as the output data D_DATA. One of signals change_1 to change_3 is set to HIGH at a timing when the data delay is stopped. The counter 53 stops the counting in response to the signal change_1 set to HIGH. When the counter 53 stops the counting, the output data D_DATA of the selector 50 changes to C, D, E, . . . according to the data transition. Then, similarly, the counting is started based on the state end signal (delayed), and the counting is stopped based on the signals change_1 to change_3.

Figure 7:
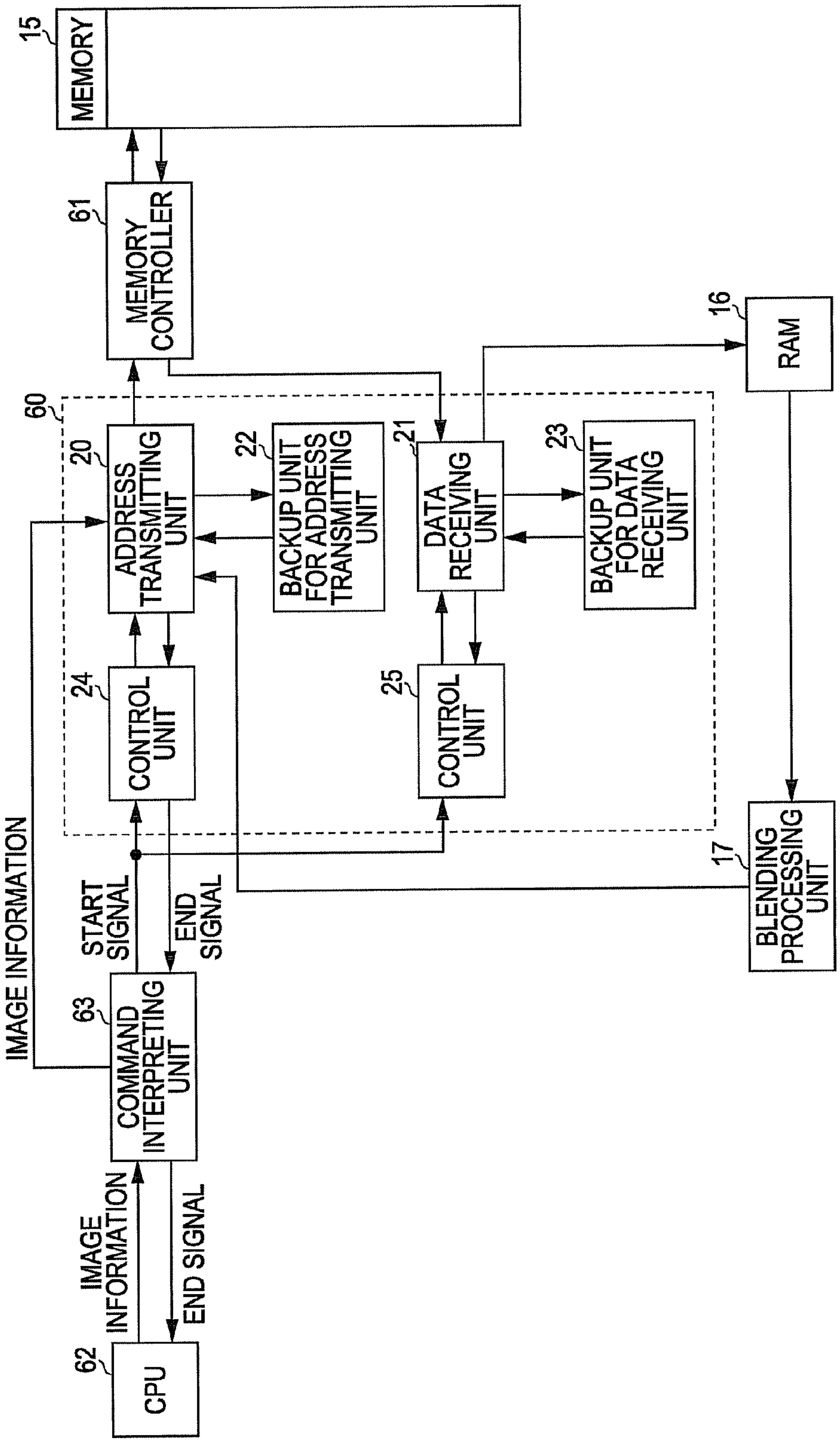
FIG. 7 illustrates an exemplary graphic processing apparatus.

FIG. 7 illustrates an exemplary a graphic processing apparatus. In the graphic processing apparatus of FIG. 7, substantially the same components as those of FIG. 2 are designated by the same numerals, and the description is omitted or reduced. The graphic processing apparatus of FIG. 7 includes a external memory 15, a external RAM 16, a blending processing unit 17, a memory access control circuit 60, a memory controller 61, a CPU 62, and a command interpreting unit 63. The memory access control circuit 60 may include, for example, the address transmitting unit 20, the data receiving unit 21, the backup unit 22, the backup unit 23, the control unit 24, and the control unit 25, which are illustrated in FIG. 2.

The CPU 62 supplies image information on a coordinate and a size of the drawing image to the command interpreting unit 63. The command interpreting unit 63 supplies a start signal to the control units 24 and 25 of the memory access control circuit 60, and the command interpreting unit 63 supplies the image information on the coordinate and size of the drawing image to the address transmitting unit 20. In response to the supplied signal and information, the memory access control circuit 60 reads the image data from the external memory 15 through the memory controller 61, supplies the read image data to the blending processing unit 17, and writes the image data in the external memory 15 after the blending processing. When these processes are completed, the control unit 24 of the address transmitting unit 20 transmits an end signal to the command interpreting unit 63. In response to the end signal, the command interpreting unit 63 transmits the end signal to the CPU 62. The CPU 62 receives the end signal to end the image drawing processing.

Figure 8:
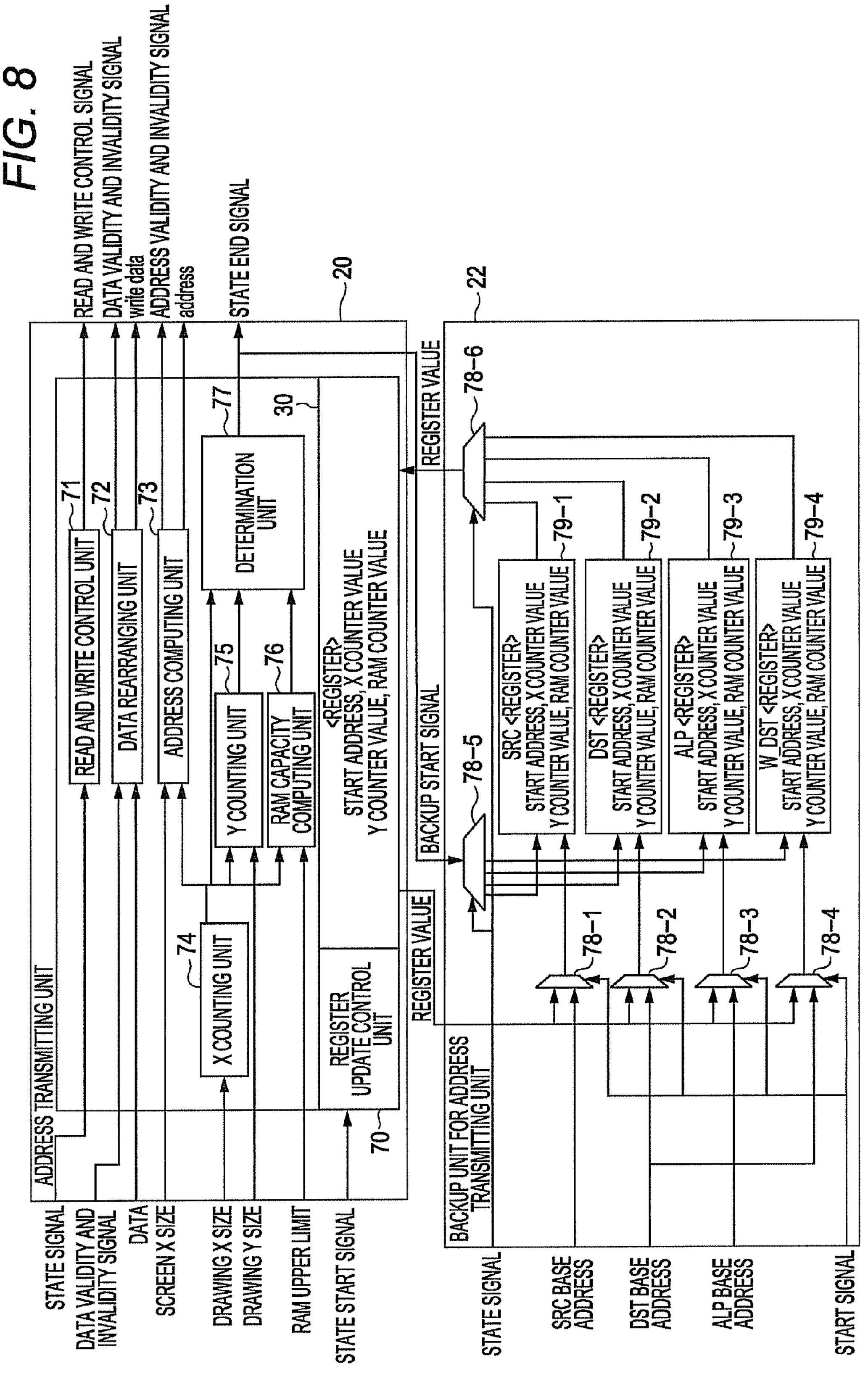
FIG. 8 illustrates an exemplary address transmitting unit and an exemplary backup unit.

FIG. 8 illustrates an exemplary address transmitting unit and a exemplary backup unit. The address transmitting unit and backup unit of FIG. 8 may be the address transmitting unit 20 and backup unit 22 of FIG. 2. The address transmitting unit 20 includes a register 30, a register update control unit 70, a read and write control unit 71, a data rearranging unit 72, an address computing unit 73, an X counting unit 74, a Y counting unit 75, a RAM capacity computing unit 76, and an end determination unit 77. The backup unit 22 includes selectors 78-1 to 78-6 and registers 79-1 to 79-4. The control unit 24 supplies the state start signal and the state signal to the address transmitting unit 20. The blending processing unit 17 supplies the blending-processed data and the data validity and invalidity signal indicating the validity and invalidity of the blending-processed data to the address transmitting unit 20. The command interpreting unit 63 supplies a screen X size, a drawing X size, a drawing Y size, and a RAM upper limit to the address transmitting unit 20. The control unit 24 supplies the state signal to the backup unit 22. The command interpreting unit 63 supplies the start signal, an SRC base address corresponding to a start memory address of the input image SRC, a DST base address corresponding to a start memory address of the output image DST, and an ALP base address corresponding to a start memory address of the alpha map ALP to the backup unit 22.

Figure 9:
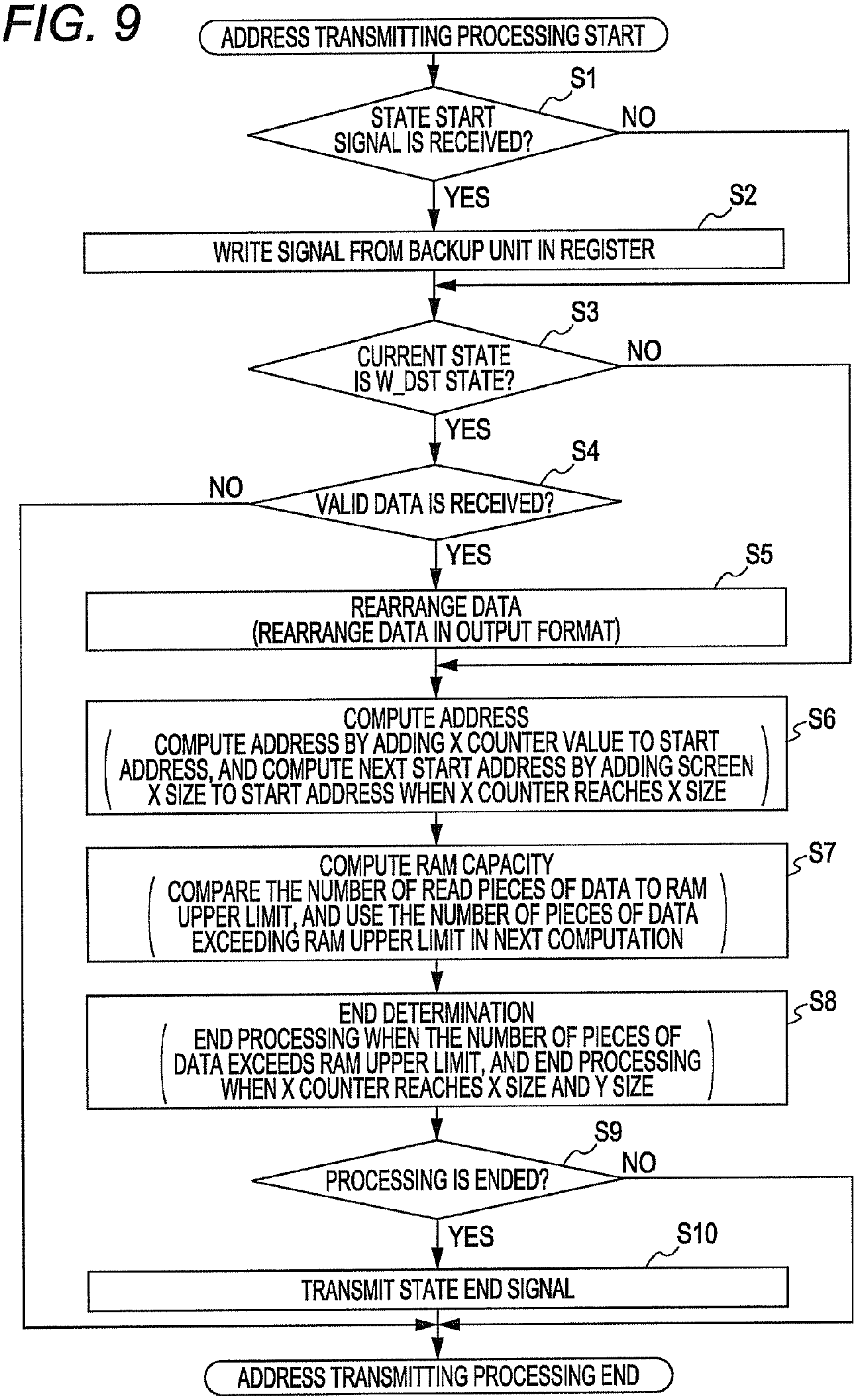
FIG. 9 illustrates an exemplary operation of an address transmitting unit.

FIG. 9 illustrates an exemplary operation of a address transmitting unit. The operation of FIG. 9 may be the operation of the address transmitting unit of FIG. 8. In operation S1, whether the register update control unit 70 receives the state start signal or not is determined. The processing goes to operation S2 when the register update control unit 70 receives the state start signal, and the processing goes to operation S3 when the register update control unit 70 does not receive the state start signal. In operation S2, the register value from the backup unit 22 is written in the register 30 under the control of the register update control unit 70. Based on the state signal from the control unit 24, the selector 78-6 selects one of the registers 79-1 to 79-4 corresponding to the current state, for example, the SRC state, for example, the register 79-1 corresponding to the SRC state. The register value of the register selected by the selector 78-6 is written in the register 30 based on a write instruction signal supplied from the register update control unit 70.

In operation S3, whether the current state is the W_DST state or not is determined. When the current state is the W_DST state, whether the data rearranging unit 72 receives the valid data or not is determined in operation S4. The processing ends when the data rearranging unit 72 does not receive the valid data. When the data rearranging unit 72 receives the valid data, the data rearranging unit 72 rearranges the data in operation S5. The blending-processed data is rearranged so as to become an output format suitable for being stored in the external memory 15. When the current state is not the W_DST state in operation S3, the processing goes to operation S6 while skipping the operations S4 and S5.

In operation S6, the address computing unit 73 computes an address, and the address computing unit 73 transmits the computed address. The read and write control unit 71 transmits the write signal when the current state is the W_DST state, and the read and write control unit 71 transmits the read signal when the current state is the state other than the W_DST state. Therefore, the data write or the data read is performed to the desired address. The transmitted address is obtained by adding an X counter value to the start address value stored in the register 30. The address is transmitted while the X counter value is incremented by one, thereby performing the memory access corresponding to the each pixel in an X direction. When the X counter value is incremented to reach the drawing X size, the screen X size is added to the start address value, and the start address of the next line, for example, the next Y coordinate is obtained. A Y counter value is incremented by one every movement to the next line, and the X counter value is initialized to zero.

In operation S7, the capacity of RAM is computed. The RAM capacity computing unit 76 counts the number of pieces of read data, for example, the number of transmitted addresses as a RAM counter value and compares the RAM counter value with the RAM upper limit. The RAM counter value exceeding the RAM upper limit is used as the next RAM counter value. In operation S8, an end determination is made, for example, an end condition is detected. The X counting unit 74 that counts the X counter value compares the X counter value and the drawing X size to supply a determination value to the end determination unit 77. The determination value indicates whether the X counter value reaches the drawing X size. The Y counting unit 75 that counts the Y counter value compares the Y counter value and the drawing Y size to supply a determination value to the end determination unit 77. The determination value indicates whether the Y counter value reaches the drawing Y size. The RAM capacity computing unit 76 supplies a determination value indicating whether the RAM counter value is equal to or more than the RAM upper limit to the end determination unit 77. When the RAM counter value is equal to or more than the RAM upper limit, the end determination unit 77 determines that the processing ends in operation S9, and the state end signal is transmitted in operation S10. For example, the state end signal is asserted. When the X counter value reaches the drawing X size while the Y counter value reaches the drawing Y size, the end determination unit 77 determines that the processing ends in operation S9, and the state end signal is transmitted in operation S10. For example, the state end signal is asserted. The address transmitting processing of the address transmitting unit 20 ends.

When the end determination unit 77 transmits the state end signal, the state end signal is supplied as a backup start signal to the backup unit 22. The demultiplexer 78-5 selectively supplies the backup start signal to the register corresponding to the state indicated by the state signal, for example, the SRC state, for example, the register 79-1 corresponding to the SRC state. The register value from the register 30 of the address transmitting unit 20 is stored in the register that receives the backup start signal. Therefore, the register value of the register 30 of the address transmitting unit 20 is saved. The start signal is asserted when the first data of each image data is read. When the start signal is in the asserted state, the register that receives the backup start signal stores the SRC base address, DST base address, and ALP base address from the outside.

Figure 10:
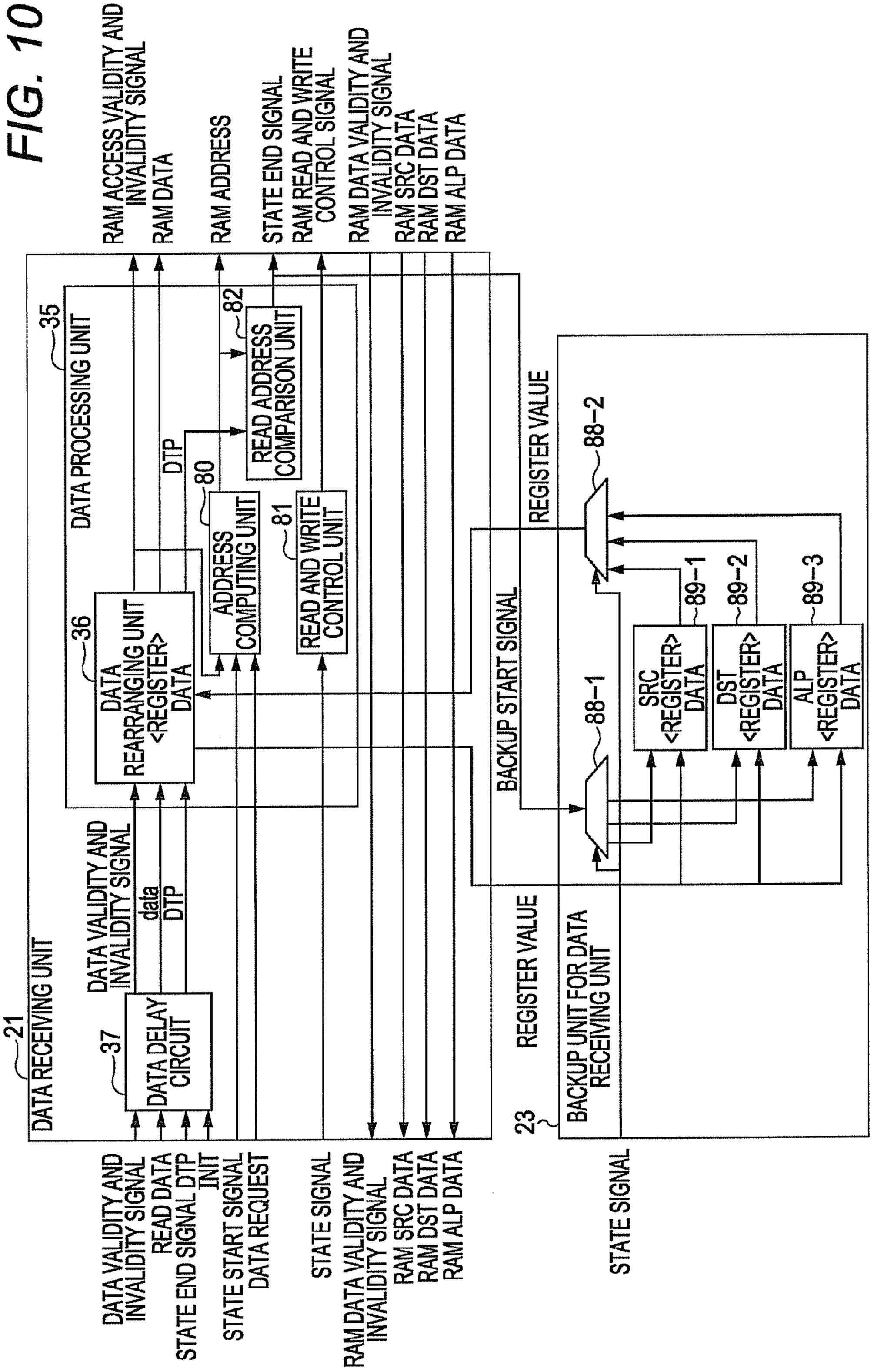
FIG. 10 illustrates an exemplary data receiving unit and an exemplary backup unit.

FIG. 10 illustrates an exemplary data receiving unit 21 and an exemplary backup unit 23. The data receiving unit and backup unit of FIG. 10 may be the data receiving unit 21 and backup unit 23 of FIG. 2. In the data receiving unit 21 and backup unit 23 of FIG. 10, substantially the same components as those of FIG. 2 are designated by the same numerals, and the description is omitted or reduced. The data receiving unit 21 includes the data processing unit 35 and the data delay circuit 37. The data processing unit 35 includes the register (data rearranging register) 36, an address computing unit 80, a read and write control unit 81, and a read address comparison unit 82. The backup unit 23 includes a demultiplexer 88-1, a selector 88-2, and registers 89-1 to 89-3. The control unit 25 supplies the state start signal and the state signal to the data receiving unit 21. The external memory 15 supplies the read data and the data validity and invalidity signal to the data receiving unit 21. The state end signal DTP read from FIFO 26 is supplied to the data receiving unit 21. The initializing signal INIT may externally be supplied, or the initializing signal INIT may internally be generated by the initializing signal producing unit 38 as illustrated in FIG. 2. The external RAM 16 supplies the SRC data, DST data, ALP data, and a RAM data validity and invalidity signal indicating the validity and invalidity of these pieces of data to the data receiving unit 21. The control unit 25 supplies the state signal to the backup unit 23.

Figure 11:
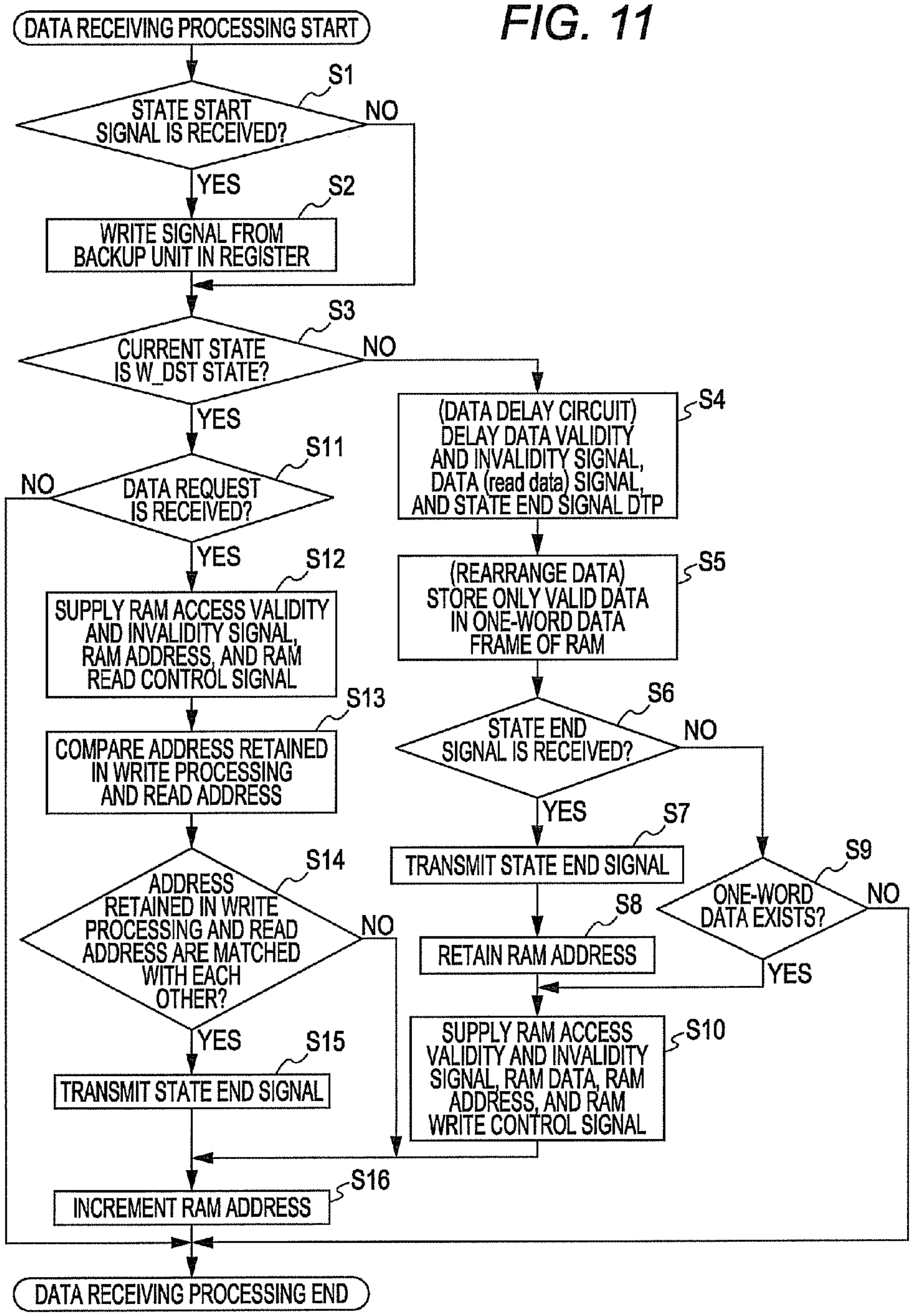
FIG. 11 illustrates an exemplary data receiving processing.

FIG. 11 illustrates an exemplary data receiving processing. The data reception of FIG. 11 may be performed by the data receiving unit of FIG. 2. In operation S1, whether the data processing unit 35 receives the state start signal or not is determined. The processing goes to operation S2 when the data processing unit 35 receives the state start signal, and the processing goes to operation S3 when the data processing unit 35 does not receive the state start signal. In operation S2, the register value from the backup unit 23 is written in the register 36. Based on the state signal from the control unit 25, the selector 88-2 selects one of the registers 89-1 to 89-3 corresponding to the current state, for example, the SRC state, for example, the register 89-1. The register value that is supplied from the register selected by the selector 88-2 is written in the register 36.

In operation S3, whether the current state is the W_DST state or not is determined. When the current state is not the W_DST state, the data delay circuit 37 delays the data validity and invalidity signal, the read data, and the state end signal in operation S4. In operation S5, the register 36 rearranges the data. The valid image data supplied from the data delay circuit 37 is written in a data frame having one word corresponding to a data unit stored in RAM by the data rearrangement. The previously-remaining data stored from the backup unit 23 is initially written in RAM. In operation S6, whether the data processing unit 35 receives the state end signal from the data delay circuit 37 or not is determined. When the data processing unit 35 receives the state end signal, the state end signal is transmitted to the control unit 25 through the read address comparison unit 82 in operation S7, and the RAM address is stored in the read address comparison unit 82 in operation S8. The processing goes to operation S10. When the data processing unit 35 does not receive the state end signal in operation S6, whether the one-word data exists or not is determined in operation S9. When the one-word data exists, the processing goes to operation S10. When the one-word data does not exist, the processing ends, thereby receiving the data again.

In operation S10, the register 36 supplies the RAM access validity and invalidity signal and the RAM data to the external RAM 16. Contemporaneously, the RAM address computed by the address computing unit 80 is supplied to the external RAM 16. Because the state indicated by the state signal is a state other than the W_DST state, the read and write control unit 81 supplies the write signal to the external RAM 16. Therefore, the image data is written in the external RAM 16. In operation S16, the RAM address is incremented.

When the current state is the W_DST state in operation S3, whether the address computing unit 80 receives a data request from the data request producing unit 32 of the address transmitting unit 20 of FIG. 2 or not is determined in operation S11. When the address computing unit 80 does not receive the data request, the data receiving processing ends. When the address computing unit 80 receives the data request, the RAM address computed by the address computing unit 80 is supplied to the external RAM 16 in operation S12. Because the state indicated by the state signal is the W_DST state, the read and write control unit 81 supplies the read signal to the external RAM 16. In operation S13, the address stored in the write processing and the read address are compared to each other. When the address stored in the write processing and the read address are matched with each other in operation S14, the state end signal is transmitted in operation S15. The read operation of the image data from the external RAM 16 ends. The data receiving unit 21 supplies the read data to the blending processing unit 17. The RAM address is incremented in operation S16, and the processing of the data receiving unit 21 ends.

When the data receiving unit 21 transmits the state end signal, the state end signal is supplied as the backup start signal to the backup unit 23. The demultiplexer 88-1 selectively supplies the backup start signal to the register corresponding to the state indicated by the state signal, for example, the SRC state, for example, the register 89-1 corresponding to the SRC state. The register value from the register 36 of the data receiving unit 21 is stored in the register that receives the backup start signal. The register value of the register 36 of the data receiving unit 21 is saved.

Figure 12:
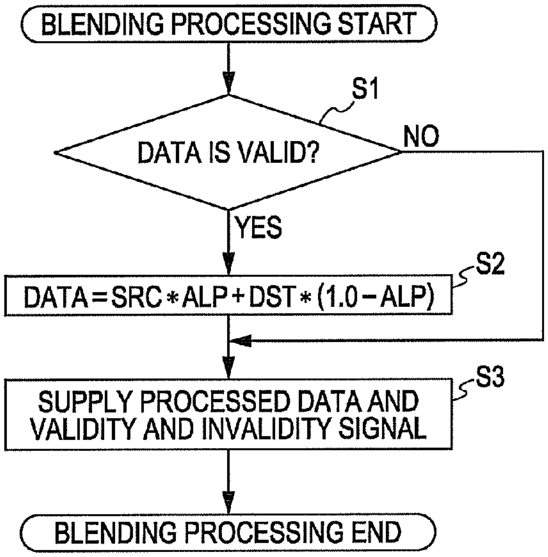
FIG. 12 illustrates an exemplary blending processing.

FIG. 12 illustrates an exemplary blending processing. The blending processing of FIG. 12 may be performed by the blending processing unit 17 of FIG. 2. In operation S1, whether the data received from the data receiving unit 21 is valid or not is determined. When the data is valid, for example, alpha blending processing DST=(1−ALP)DST+ALP·SRC is performed in operation S2. Alternatively, other blending processing such as the substitution and the multiplication may be performed. In operation S3, the blending-processed data and the validity and invalidity signal indicating the validity or invalidity of the blending-processed data are supplied to the address transmitting unit 20. The processing of the blending processing unit 17 ends.

Example embodiments of the present invention have now been described in accordance with the above advantages. It will be appreciated that these examples are merely illustrative of the invention. Many variations and modifications will be apparent to those skilled in the art.

What is claimed is:

1. A memory access control circuit, comprising:

a first internal register;

an address transmitting unit that transmits a first address obtained based on a first value which is set in the first internal register based on a first state signal indicating a first state and transmits a second address obtained based on a second value which is set in the first internal register based on the first state signal indicating a second state;

a second internal register;

a data receiving unit that receives first data corresponding to the first address, performs data processing on the first data without delay using a third value which is set in the second internal register based on a second state signal indicating a third state, receives second data corresponding to the second address, and performs data processing on the second data after delaying the second data by a given delay time using a fourth value which is set in the second internal register based on the second state signal indicating a fourth state;

a first backup unit; and a second backup unit, wherein, in response to completion of transmission of the first address from the address transmitting unit or the second address from the address transmitting unit, the first value or the second value in the first internal register is stored in the first backup unit, respectively, and wherein, in response to completion of the data processing of the first data by the data receiving unit, the third value in the second internal register is stored in the second backup unit by utilizing the given delay time and the fourth value is set to the second internal register by the second backup unit.

2. The memory access control circuit according to claim 1, further comprising:

a delay circuit that receives an end signal from the address transmitting unit and delays the end signal to generate the delayed end signal, the end signal indicating the completion of the transmission of the first address from the address transmitting unit, wherein the data receiving unit delays the received series of second data by the given delay time in response to the delayed end signal delayed.

3. The memory access control circuit according to claim 1, wherein the data processing includes storing the first data and the second data in a memory.

4. The memory access control circuit according to claim 2, wherein the data processing includes storing the first data and the second data in a memory.

5. The memory access control circuit according to claim 2, wherein the delay circuit includes FIFO.

6. The memory access control circuit according to claim 2, wherein the data receiving unit includes:

a selector;

a first data path through which at least one of the first data and the second data is supplied to the selector without delay; and a second data path through which at least one of the first data and the second data is supplied to the selector by delaying the at least one of the first data and the second data by a given delay time, wherein the selector selects data of the first data path before arriving the delayed end signal, and selects data of the second data path after arriving the delayed end signal.

7. The memory access control circuit according to claim 2, wherein the data receiving unit includes:

a plurality of flip flops coupled in series;

a shift register that sequentially delays at least one of the first data and the second data using the flip flops;

a selector that receives output data from the plurality of flip flops; and a counter that starts counting in response to the delayed end signal, wherein the selector selects one of output data from the plurality of flip flops according to a counter value.

8. The memory access control circuit according to claim 1, further comprising:

a first control unit that controls a transition of the first state signal; and a second control unit that controls a transition of the second state signal, wherein the first control unit and the second control unit are separately provided.

9. The memory access control circuit according to claim 8, wherein the first state signal and the second state signal four states, and wherein the four states include a state in which a read address of first image data is transmitted, a state in which a read address of second image data is transmitted, a state in which a read address of third image data is transmitted, and a state in which a write address of fourth image data generated based on the first to third image data is transmitted.

10. The memory access control circuit according to claim 9, wherein the first image data includes input image data, wherein the second image data includes output image data, wherein the third image data includes an alpha map, and wherein the fourth image data includes output image data generated by alpha-blending of the input image data and the output image data using the alpha map.

11. An image processing system comprising:

a memory access control circuit that reads image data from an external memory; and an image processing unit that processes the image data read by the memory access control circuit, wherein the memory access control circuit includes:

a first internal register;

an address transmitting unit that transmits a first address obtained based on a first value which is set in the first internal register based on a first state signal indicating a first state and transmits a second address obtained based on a second value which is set in the first internal register based on the first state signal indicating a second state;

a second internal register;

a data receiving unit that receives first data corresponding to the first address, performs data processing on the first data without delay using a third value which is set in the second internal register based on a second state signal indicating a third state, receives second data corresponding to the second address, and performs data processing on the second data after delaying the second data by a given delay time using a fourth value which is set in the second internal register based on the second state signal indicating a fourth state;

a first backup unit; and a second backup unit, wherein, in response to completion of transmission of the first address from the address transmitting unit or the second address from the address transmitting unit, the first value or the second value in the first internal register is stored in the first backup unit, respectively, and wherein, in response to completion of the data processing of the first data by the data receiving unit, the third value in the second internal register is stored in the second backup unit by utilizing the given delay time and the fourth value is set to the second internal register by the second backup unit.

12. The image processing system according to claim 11, further comprising:

a delay circuit that receives an end signal from the address transmitting unit and delays the end signal to generate the delayed end signal, the end signal indicating the completion of the transmission of the first address from the address transmitting unit, wherein the data receiving unit delays the received series of second data by the given delay time in response to the delayed end signal delayed.

13. The image processing system according to claim 11, wherein the data processing includes storing the first data and the second data in a memory.

14. The image processing system according to claim 12, wherein the data processing includes storing the first data and the second data in a memory.

15. The image processing system according to claim 12, wherein the delay circuit includes FIFO.

16. The image processing system according to claim 12, wherein the data receiving unit includes:

a selector;

a first data path through which at least one of the first data and the second data is supplied to the selector without delay; and a second data path through which at least one of the first data and the second data is supplied to the selector by delaying the at least one of the first data and the second data by a given delay time, wherein the selector selects data of the first data path before arriving the delayed end signal, and selects data of the second data path after arriving the delayed end signal.

17. The image processing system according to claim 12, wherein the data receiving unit includes:

a plurality of flip flops coupled in series;

a shift register that sequentially delays at least one of the first data and the second data using the flip flops;

a selector that receives output data from the plurality of flip flops; and a counter that starts counting in response to the delayed end signal, wherein the selector selects one of output data from the plurality of flip flops according to a counter value.

18. The image processing system according to claim 11, further comprising:

a first control unit that controls a transition of the first state signal; and a second control unit that controls a transition of the second state signal, wherein the first control unit and the second control unit are separately provided.

19. The image processing system according to claim 18, wherein the first state signal and the second state signal indicate four states, and wherein the four states include a state in which a read address of first image data is transmitted, a state in which a read address of second image data is transmitted, a state in which a read address of third image data is transmitted, and a state in which a write address of fourth image data generated based on the first to third image data is transmitted.

20. The image processing system according to claim 19, wherein the first image data includes input image data, wherein the second image data includes output image data, wherein the third image data includes an alpha map, and wherein the fourth image data includes output image data generated by alpha-blending of the input image data and the output image data using the alpha map.

* * * * *